R. C. MAUCK.
Grain Winnower.
No. 30,978.
Patented Dec. 18, 1860.
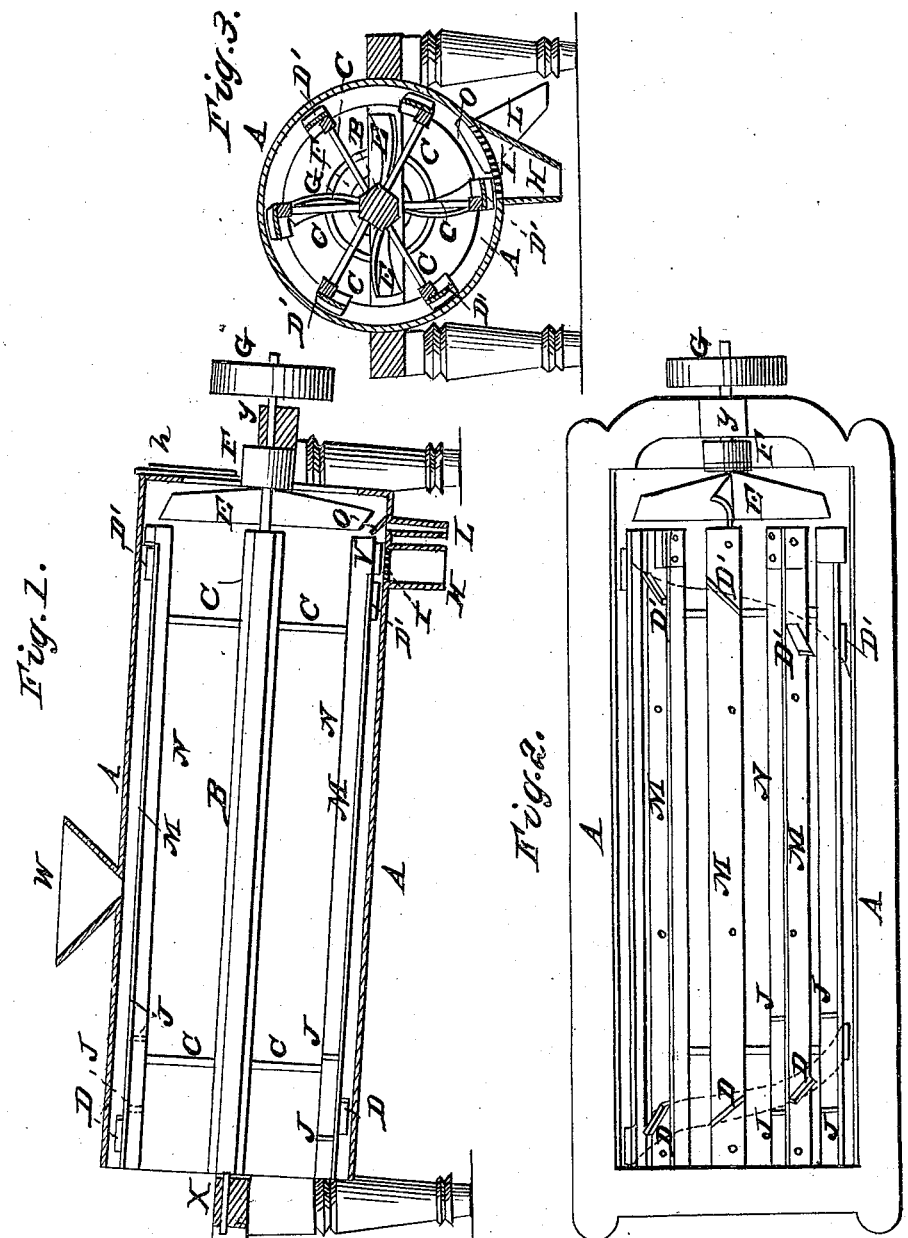

UNITED STATES PATENT OFFICE.

R. C. MAUCK, OF HARRISONBURG, VIRGINIA.

MACHINE FOR CLEANING GRAIN.

Specification of Letters Patent No. 30,978, dated December 18, 1860.

*To all whom it may concern:*

Be it known that I, R. C. MAUCK, of Harrisonburg, in the county of Rockingham and State of Virginia, have invented a new and useful Improvement in Cleaning Grain; and I do hereby declare that the following is a full, clear, and exact description of the same, reference being had to the accompanying drawings, forming a part of this specification, in which—

Figure 1, represents a longitudinal, Fig. 2, a horizontal, and Fig. 3, a vertical, section of the machinery.

Similar letters of reference, in each of the figures indicate corresponding parts.

To enable others, skilled in the art, to make and use my invention, I will proceed to describe its construction and operation.

A reel consisting of a shaft B, arms C, and longitudinal reel bars N, is arranged in suitable bearings X, Y, concentric with an inclined cylinder A. The reel is made to revolve by means of a pulley G, and band at the rear end of the reel. The cylinder is stationary and forms at its rear end, a fan case in which a revolving fan blower E, is arranged. The fan E, is revolved by means of a pulley F, the fan and pulley being loose on the reel shaft so that they may be revolved with a greater velocity than the reel. The size of the opening at the end of the fan case can be adjusted by means of a slide $z$, so as to admit more or less air and thus to regulate the blast created by the fan. Close to the fan case, one or two spouts H, L, extend from the bottom of the cylinder, the one H, being covered by a wire screen I, the meshes of which are large enough to let the grain pass through, and the other L, if used, being partially covered and separated from the fan case by an inclined guard O. The bars N, of the reel are provided with projecting strips M, extending nearly the whole length of the bars N, and being arranged tangentially to the circumference of the reel. Each of these strips M, together with its bar N, form a kind of bucket elevator extending the whole length of the reel.

Oblique flanges D, D', project from the outside of the strips N, near both ends of the reel, the flanges D, forming a right and the flanges D', a left screw line, as indicated by red lines in Fig. 2.

Right angled flanges J, J,—serving as checks, as will be described hereinafter—are arranged in the buckets near the front end of the reel.

The grain is fed into the cylinder through a hopper W, in the top part and at about half the length of the cylinder. As the grain drops down between the reel bars, it is acted upon by the blast of wind created by the fan, so as to blow dust and all impurities lighter than the grain, out at the open front end of the cylinder. The blast of air partially retards the descent of the grain and consequently the grain moves gradually down to the discharge spout; its descent, though gradual, finally taking place owing to its specific gravity being great enough to overcome the blast of the fan. The grain as it gathers at the bottom of the cylinder is constantly gathered up and raised by the buckets of the revolving reel and as the buckets thus filled pass around, the grain is dropped in a thin vertical shower, as it were, and thus it is again and again acted upon by the blast of wind. The grain, while in the buckets is exposed to the full force of the blast and is apt to be blown forward along the smooth surface of the buckets. To prevent it from thus finding its way out at the front end of the cylinder, the checks J, are arranged across the buckets near the front end of the reel. Such grain as may—in consequence of the action of the blast—gradually work up toward the front end of the cylinder and lie beneath the buckets is scraped back by the screw flanges D, until it gathers in a pile large enough to be acted upon by the buckets and thus its agitation and separation from foreign substances before it is allowed to pass off is insured.

The cylinder is inclined backward so that the grain gathering at the bottom of the cylinder has a tendency to move back toward the discharge spout H, a tendency assisted by the action of the screw flanges D. But to prevent a too rapid discharge of the grain and a chance escape of cheat with the same, the screw flanges D', near the rear end of the reel are provided, and they serve to scrape the grain and such cheat as may be mingled with it forward, and thus again subject it to the action of the bucket elevators and blast, as above described. The clean grain as it finally reaches the wire screen I, is discharged through the spout H. Impurities of large size, such as heads &c., pass over the wire screen I, being shielded from the action of the blast and from being blown forward by the inclined guard O, and find their way out through the spout L, if provided.

Radial scrapers V, are arranged at the rear ends of the reel bars, which as they sweep across the wire screen I, assist the grain in finding its way through the meshes of the screen and prevent them from being choked up.

It will be understood that not only grain, but seeds of various kinds can be cleaned by subjecting them to the action of the above described machinery.

I have mentioned that the use of the spout L, is optional; but I should have remarked that in case it is not provided at the place shown in the drawings, the grain must be fed to the machine through a perforated sieve placed over the hopper in order that the foreign matter shall be prevented from passing in with the grain.

What I claim as my invention and desire to secure by Letters Patent, is—

1. The combination of the inclined cylinder A, and rotary longitudinal buckets or scoops M, N, constructed and operating in connection with a fan blast substantially in the manner set forth to subject the grain to a succession of falls in its passage to the lower end of the cylinder and expel the lighter refuse at the upper end.

2. The right and left flanges D, D', in the described combination with the reel B, C, N, and inclined cylinder A, for the purposes explained.

3. The transverse checks J, in the described combination with the inclined longitudinal buckets M, N, and fan E, for the purpose set forth.

4. The guard O, applied between the fan E, and spout L, substantially as and for the purposes explained.

R. C. MAUCK.

Witnesses:
  GOODWIN Y. AT LEE,
  R. W. FENWICK.